United States Patent
Robbins

(10) Patent No.: US 6,190,558 B1
(45) Date of Patent: Feb. 20, 2001

(54) REVERSE OSMOSIS PURIFICATION SYSTEM

(75) Inventor: Adam Robbins, San Marcos, CA (US)

(73) Assignee: Nimbus Water Systems, Inc., San Marcos, CA (US)

( * ) Notice: Under 35 U.S.C. 154(b), the term of this patent shall be extended for 0 days.

(21) Appl. No.: 09/283,682

(22) Filed: Apr. 1, 1999

(51) Int. Cl.⁷ .................................................. B01D 61/00
(52) U.S. Cl. .............................. 210/652; 210/90; 210/87; 210/96.2; 210/96.1; 210/97; 210/134; 210/805; 210/257.2; 210/195.2
(58) Field of Search ................................. 210/652, 195.2, 210/257.2, 85, 96.1, 96.2, 86, 87, 97, 100, 134, 102, 805, 90

(56) References Cited

U.S. PATENT DOCUMENTS

| | | |
|---|---|---|
| 3,568,843 | 3/1971 | Brown . |
| 3,774,763 | 11/1973 | Yall et al. ............................ 210/96 |
| 3,794,172 | 2/1974 | Bray . |
| 3,794,173 | 2/1974 | Bray . |
| 3,939,074 | 2/1976 | Bray . |
| 3,959,146 | 5/1976 | Bray . |
| 4,169,789 | 10/1979 | Lerat . |
| 5,000,845 | 3/1991 | Solomon .......................... 210/134 |
| 5,078,864 | 1/1992 | Whittier ........................... 210/137 |
| 5,154,820 | 10/1992 | Solomon .......................... 210/134 |
| 5,207,916 | 5/1993 | Goheen et al. .................... 210/637 |
| 5,261,792 | 11/1993 | Schoenmeyr ....................... 417/38 |
| 5,460,716 | 10/1995 | Wolbers ........................... 210/136 |

*Primary Examiner*—Ana Fortuna
(74) *Attorney, Agent, or Firm*—Fitch, Even, Tabin & Flannery

(57) ABSTRACT

A reverse osmosis water purification system for providing potable water from a municipal water or other source containing undesired impurities. A motor driven pump supplies a feed stream to a reverse osmosis unit resulting in the creation of a product water stream and a concentrate or brine stream. The inclusion of a product water holding tank may be optionally omitted by routing the product water outlet stream directly to the tap via a branched line. A pressure sensor causes a solenoid valve to open when the withdrawal of water from the tap is terminated, opening a valve in the branch line leading back to the pump. The pump then continues to run, recirculating the product water stream to a mixing unit where it is blended with a major part of the concentrate stream that is being recycled and with make-up fresh water to create a composite feed stream. As the system continues to run in this recirculation mode, the composite feed stream entering the purification unit becomes gradually purer, and once the quality reaches a desired level, the system is placed in shutdown mode. Because of the high quality of the water on the feed side of the membrane in the reverse osmosis unit, little contamination of the purified water on the product side occurs during shutdown.

15 Claims, 1 Drawing Sheet

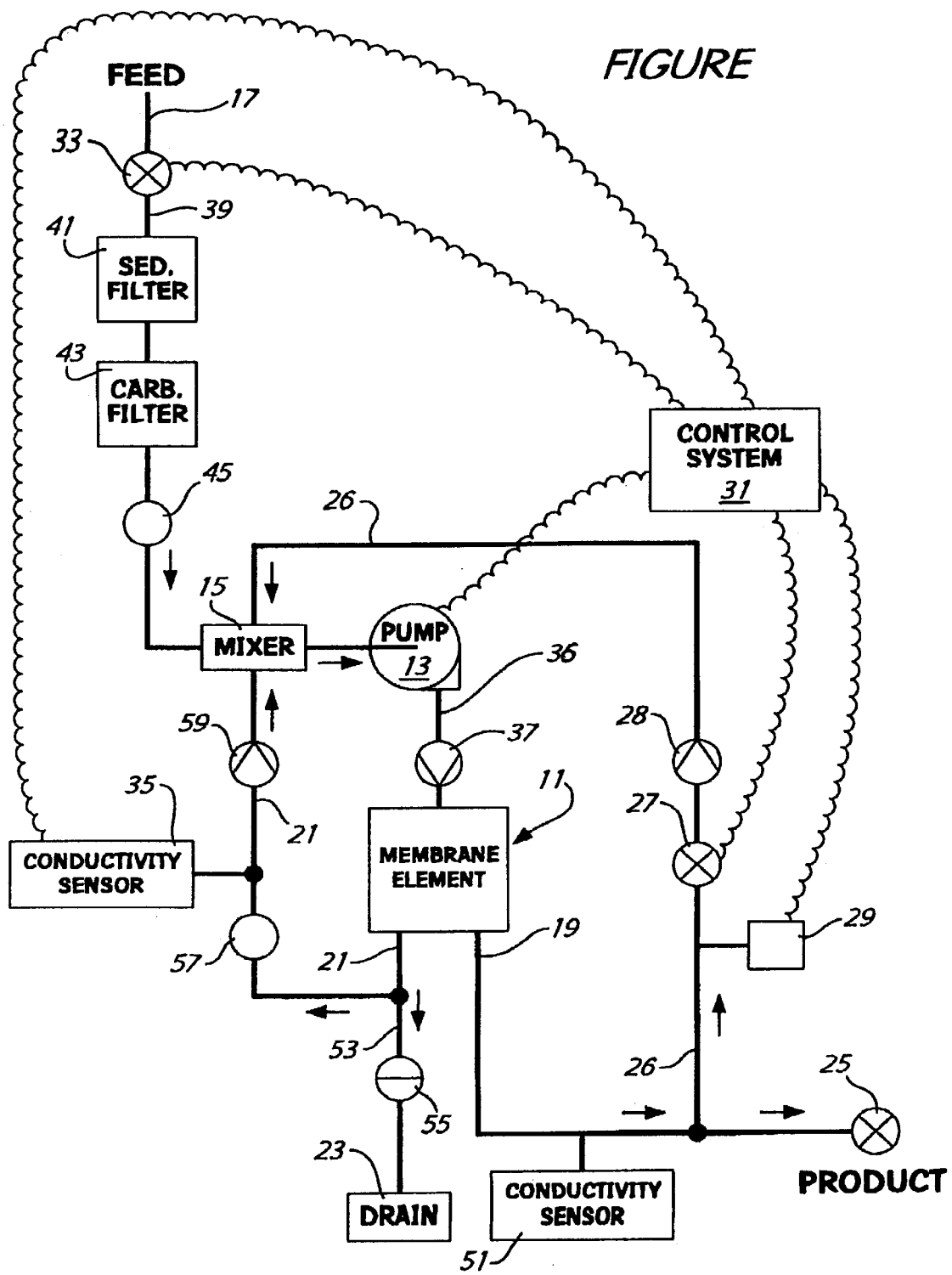
FIGURE

REVERSE OSMOSIS PURIFICATION SYSTEM

FIELD OF THE INVENTION

This invention relates to apparatus for providing potable water through the use of a reverse osmosis purification unit.

BACKGROUND OF THE INVENTION

Reverse osmosis units have been used for a number of decades to purify water for home, municipal and industrial uses. Examples of purification systems using reverse osmosis units to provide quantities of potable water suitable for home or other relatively limited uses are shown in the following patents of Donald T. Bray: U.S. Pat. Nos. 3,568,843; 3,794,172; 3,794,173 and 3,939,074. Such self-contained systems were generally designed to provide potable water on demand by being essentially permanently connected to a municipal water supply line pressure. They created a ready reservoir of purified or potable water which would be available to be dispensed to a user, either by gravity flow or by flow driven by the expansion of air compressed behind a bladder within a confined tank or the like.

Reverse osmosis membrane separation devices generally function on the basis of employing a significant fluid pressure difference between the inlet side of the membrane barrier, i.e., the feed side, and the opposite side of the membrane barrier, i.e., the product side. This pressure difference motivates the flow of fluid through the micropores of the membrane barrier while generally preventing the passage of salt and mineral solutes through the membrane. However, when such a membrane separation device is operated only intermittently, as is the practice with respect to most small scale household or domestic appliance versions of such reverse osmosis systems, a typical cyclic process occurs with every shutdown and start-up. Once the pressure difference across the membrane barrier is removed as a result of shutdown, flow through the membrane to the product side ceases. As a result, the two volumes of fluid which now occupy the void spaces on both sides of the membrane barrier are no longer subject to this pressure-driven osmotic separation effect. Consequently, the salt and mineral solutes in the liquid on the feed side of the membrane are now able to slowly pass through the membrane barrier and mix with the fluid on the product side, and the solutes generally continue to do so until equilibrated common solutions have been formed on both sides of the membrane.

When start-up again occurs so that high pressure and liquid flow are reestablished on the feed side of the membrane device, the osmotic separation process resumes; however, the residual volume of higher salt and mineral content liquid on the product side of the membrane in the purification unit will constitute the first portion of the product water stream to be discharged from the unit before a truly purified outlet stream will again be discharged from the purification unit. In most small scale or domestic appliance-type membrane separation systems, a liquid accumulation reservoir or tank is provided into which the discharge from the membrane purification unit is directed. Such a tank provides for rapid dispensing of a fairly large quantity of product liquid at the tap or other point of use, and because the tank or reservoir will be repeatedly filled to its desired capacity during periods of non-use, this arrangement permits the use of a small, economical membrane separation device having only a relatively low, direct, product flow rate. In such a system configuration, the problem of high salt and mineral content accumulating in the small volume of liquid on the product side within the purification unit during periods of shutdown becomes minimal because this small volume will be flushed into the tank or reservoir at the time of start-up where it becomes highly diluted with the very considerable volume of liquid within the product holding tank; as a result, the ultimate product remains generally acceptable.

However, there is some contamination of the product side liquid which is occurring and which, although acceptable, is still undesirable, and the search for new and improved water purification systems is an always continuing one.

SUMMARY OF THE INVENTION

The present invention provides a domestic reverse osmosis membrane separation system or the like, and a method for operating same, wherein one or more water purification units are employed which provide relatively high capacity and high performance and which are arranged so as to satisfactorily supply potable water directly to a point of use from a purification unit or units, if desired, without a product holding tank or reservoir. The design is such that significant product side contamination by salts and/or minerals during a dormant period, i.e., in the initial volume of product that is delivered upon opening the tap, is eliminated, thus providing overall improvement in the quality of potable water delivered by the unit.

Such an improved, demand-type, reverse osmosis water purification system employs a motor-driven pump which begins operation as soon as the tap is opened and continues to operate for a certain additional period following closing of the tap, during which additional period a recirculation loop is established where purified water permeating through the membrane to the product side is recirculated toward the feed side of the reverse osmosis purification unit where it mixes with a normally partially recirculating stream from the concentrate or brine side and also with a small amount of makeup water from the impure water source. Such a recirculation operation is continued until the salt and mineral level of the feed stream flowing to the purification unit has been reduced to an acceptably low level, as a result of which only insignificant contamination of the product-side liquid in the purification unit will occur as a consequence of equilibrium flow across the membrane during that shutdown period when the system is intermittently at rest, awaiting the next opening of the tap.

BRIEF DESCRIPTION OF THE DRAWINGS

The FIGURE shows a schematic view of a reverse osmosis water purification system incorporating various features of the invention which is designed to provide potable water on demand and which is capable of satisfactorily functioning without the incorporation of any product water holding tank.

DETAILED DESCRIPTION OF THE PREFERRED EMBODIMENTS

Illustrated in the FIGURE is a reverse osmosis water purification system for providing potable water from an impure aqueous source. Basically, the system includes a reverse osmosis purification unit 11 which is connected downstream of a motor driven pump 13 which takes its feed from a mixing unit 15 that is connected to an impure aqueous source 17. The reverse osmosis purification unit 11 creates two aqueous streams. A potable water stream is discharged through a product outlet line 19, and an aqueous concentrate stream is discharged through a brine or concentrate outlet line 21. A minor portion of the concentrate stream is discharged to drain 23, while the major portion is recycled to the mixing unit 15. The product water outlet line 19 is branched, with a first branch leading to a faucet or tap 25 through which potable water is withdrawn from the system. A second branch 26 leads back to the mixing unit 15 through a solenoid valve 27 and a check valve 28. The solenoid valve 27 is operated in response to signals generated by a pressure sensor 29 which reads the pressure in the product water line 19 upstream of the faucet or tap 25.

The system is designed to operate without the usual accumulation tank or reservoir which is normally included in such a domestic system to serve as a product water holding tank. As a result, potable water is supplied as a direct flow from the purification unit 11, driven by the operation of the pump 13 which is supplying high pressure feed. Briefly, when the tap 25 is opened to withdraw water from the system, the pressure in the product line 19 drops, causing the pressure sensor 29 to send a signal to a control system 31. The control system 31 immediately supplies power to an electric motor which drives the pump 13 and opens a solenoid valve 33 to allow flow to occur from the water source through the mixer unit to the pump. For so long as the tap 25 is open, the pump will continue to run, and a major portion of the concentrate stream will be recirculated through the mixing unit 15 where it is blended with the incoming feed.

Once the user has obtained the quantity of water that is desired and closes the tap 25, the pressure in the product water conduit 19 immediately rises. When this rise in pressure is detected as a result of a signal then sent by the pressure sensor 29 to the control system 31, the solenoid valve 27 is caused to open; thereafter, the entire flow of product water from the unit is recirculated through the mixing unit 15 to the pump. As a result of the purer feed which is now entering the pump, both the water on the feed side of the purification unit and the concentrate stream will gradually become purer so long as operation continues in this recirculation mode wherein, with some percentage of the concentrate stream continuously being diverted to drain 23.

A conductivity sensor 35 is associated with the concentrate stream, and this sensor continuously sends a signal to the control system 31 which is indicative of the amount of dissolved solids present in the concentrate stream. When this signal ultimately indicates that a predetermined, low concentration of dissolved solids has been achieved in the concentrate stream which is indicative of a still lower overall solids concentration on the feed side of the membrane element in the purification unit, the control system 31 shuts down the system by closing the solenoid-operated recirculation valve 27, halting operation of the motor driven pump 13 and closing the supply valve 33. The system remains in this shutdown, ready condition until the tap 25 is again opened to withdraw more potable water. As explained in more detail hereinafter, as a result of filling of the feed side of the water purification unit 11 with water of relatively low dissolved solids concentration, there is minimum contamination of the water on the product side in the unit 11 as a result of equilibrium transfer during the shutdown period when there is no pressure differential. Thus, even the water which is initially delivered to the user upon opening the tap has low dissolved solids content and good taste.

The reverse osmosis purification unit 11 can be any commercially available unit as are well known in this art, such as one of those shown in the United States patents mentioned hereinbefore, the disclosures of which are incorporated herein by reference. Although the purification unit is preferably a spirally wound reverse osmosis unit, other types of reverse osmosis separation devices using tubular membranes or the like can alternatively be employed. As previously mentioned, the supply of a pressurized aqueous feed to such a reverse osmosis unit causes liquid permeate to flow through the membrane surface and generate a permeate stream of product water of very low dissolved solids concentration, while a continuous discharge of aqueous concentrate or brine exits from the downstream end of the unit as is well known in this art. For a demand-type system of this type, usually the spirally-wound reverse osmosis membrane purification unit will include at least about 2 square meters of effective membrane surface area through which permeation can occur. If desired, two such spirally-wound purification units can be used in parallel.

The pump 13 can be any motor driven pump capable of producing a suitable stream of water at the desired flow rate and at a pressure of about 60 to about 400 psig, from a relatively low pressure water supply, which may frequently be municipal water supply pressure, or a reduced pressure version thereof. Preferably, the pump 13 is driven by an electric motor so that it can be quickly started by the control system 31 and will rapidly reach the desired output; however, any suitable motor drive, e.g. an internal combustion engine, could alternatively be used depending upon the location of the system in question. Preferably, the pump 13 is designed and sized so as to supply an aqueous stream to the purification unit 11 at a pressure of at least about 60 psig and more preferably of at least about 100 psig and a flow rate of at least about 1–2 gallons per minute. The pump 13 discharges through a conduit 36 which contains a standard one-way check valve 37 and connects to the inlet to the purification unit 11.

The impure aqueous source 17 may be the usual municipal water supply line through which water is supplied to households or other businesses at a standard pressure of about 50–60 psig. Alternatively, it might be a source of well water or brackish water. In Southern California or Arizona, it might be mainly mineral-laden water from the Colorado River which is clearly in need of purification to improve its taste. Conventional plumbing is used to connect the system to a cold water supply line, which may include an inlet conduit arrangement 39 which preferably includes the solenoid-operated supply valve 33, a sediment filter 41, an activated carbon filter 43 and a pressure reducer 45. The sediment filter 41 removes particulate matter, usually particulates having a nominal size range of about 1 to 20 microns and larger, from the inlet stream, and the output from the sediment filter enters an activated carbon filter 43, as well known in this art, which removes chlorine and certain other dissolved elements and organic compounds from the liquid inlet stream which would contribute to off-taste. The discharge from the carbon filter 43 is directed to a pressure regulator 45 which is set to provide a uniform line pressure. The purpose of the regulator 45 is to provide a uniform, regulated pressure of about 25 psig to the mixer unit 15; this allows appropriate blending of the three streams, i.e., the fresh water, the returning concentrate stream and the recirculating product water stream, flow of the latter of which occurs intermittently just before the system is shut down following termination of each withdrawal of potable water.

The mixing unit can be any simple-type manifold arrangement where three inlet streams are combined to provide a single outlet stream. The unit may optionally contain suitable baffles so as to insure thorough mixing. The pump 13 takes its suction from the outlet from the mixing unit 15 and discharges into line 36 which contains a standard check valve 37 and is connected to the feed inlet to the purification unit 11.

The product water line 19 is connected to the product outlet from the purification unit and preferably contains a conductivity or other equivalent sensor 51 which can be used to intermittently monitor the quality of the purified water being produced by the unit for dissolved solids. This is standard in a reverse osmosis purification system, and when the sensor 51 begins to show a higher value which is indicative of greater than the predetermined maximum acceptable amount of dissolved minerals and salts passing through the membrane, this serves as an indication that the unit has reached the end of its useful life and is due for replacement by a fresh spirally-wound membrane module. As previously indicated, the product water conduit 19 is branched, with the main conduit leading to the faucet or tap 25 and with the side recirculation branch 26 leading back to the pump 13 via the mixing unit 15. The side branch 26 includes the liquid pressure sensor 29 which reads the pressure in the product line downstream from the purification unit and sends an electrical signal, which is indicative of that pressure, to the control system 31. The recirculation branch 26 contains the solenoid-operated, off-on valve 27 and a standard check valve 28 which allows flow only in the downstream direction.

The brine or concentrate line 21 leading from the brine outlet of the purification unit 11 leads back to the mixing unit 15 and carries the remainder of the outlet flow from the purification unit. Thus, it carries flow equal to the total feed into the unit less the product water flow which exits via the line 19. The line 21 is branched with a side branch 53 leading to the drain 23. The side branch 53 contains a flow reducer 55 which may, if desirable, be adjustable and which is sized so as to split off or divert a certain percentage of the total volume of liquid exiting the unit 11 and direct it to drain 23. Generally, the flow reducer 55 will be chosen and/or set so that at least about 10%, and preferably at least about 20% of the brine outlet in the line 21 from the purification unit is continuously directed to drain. The brine line 21 leading back to the mixing unit contains a pressure-reducing valve 57 and a standard check valve 59. The inclusion of a pressure reducer 57 is standard for spiral wound membrane reverse osmosis purification units; it is set so as to assure that a desired minimum pressure is maintained on the feed side of the membrane to drive the osmotic process. As previously mentioned, the pressure reducer in combination with the pump should preferably maintain a feed side pressure of at least about 100 psig, and up to about 400 psig, on the feed side of the membrane unit, and preferably at least about 75% of the feed flow to the unit 11 exits via the brine line 21. The sensor 35, which was mentioned previously, is similar to the sensor 51; it gives a reading which is representative of the amount of the dissolved salts and minerals in the concentrate stream in the conduit 21 being recycled back to the mixing unit 15 and thus is also indicative of the quality of the feed stream entering the purification unit 11 through the line 36.

In operation of the overall illustrated system, once the user opens the tap 25 to withdraw water, the pressure sensor 29 registers an immediate drop in the liquid pressure in the line, causing the control system 31 to immediately open the main supply valve 33 and start the motor which drives the pump 13. The imposition of a feed side pressure of, for example, about 100 psig, on the purification unit causes flow to occur from end to end through the spirally-wound purification unit 11 and for product water to permeate through the membrane and exit via the product outlet, causing a continuous flow of product water to begin in the conduit 19. The pump may be sized, for example, to create a flow of about 2 gallons per minute at a pressure of about 100 psig, and under standard operating conditions, this will result in a product water outlet of about 0.5 gallon per minute and a concentrate stream flow of about 1.5 gallons per minute. Of this amount, about 80% of the concentrate stream will be returned to the mixing unit 15, with the remaining 20% being directed to the drain 23 through the flow reducer 55.

Operation in this manner continues until the desired volume of water has been withdrawn from the system, at which time the user who has completed the withdrawal of water closes the faucet or tap 25. Because the pump 13 is still running when the tap 25 is closed, pressure immediately builds up in the line 19 and the branch 26 and is sensed by the pressure sensor 29 which sends a signal to the control system 31 that causes the solenoid valve 27 to open so that all of the product water is then recirculated through the line 26 to the mixing valve 15, providing a composite stream to the pump inlet. Once this occurs, the control system 31 monitors the signals from the conductivity or dissolved solids sensor 35 that is associated with the concentrate line 21. Because the quality of the water flowing into the pump 13 is now significantly improved as a result of the addition of the entire product water stream, the brine exiting from the unit 11 will accordingly become increasingly lower in dissolved solids content because of the higher quality water on the feed side of the membrane. As operation continues, this quality will continue to improve because of the increasingly lower solids content of the concentrate stream being recycled to the mixing unit 15 and results in the composite feed stream becoming of higher and higher quality.

The control system 31 is set so that, once the sensor 35 sends a signal which is indicative of a high quality concentrate, i.e., less than a predetermined amount of dissolved salts and minerals, all operations are stopped, and the system is placed in shutdown or dormant condition, i.e., the pump 13 is stopped and the solenoid-operated valves 27 and 33 are closed. These conditions will then continue to exist until a user again opens the tap 25.

During shutdown condition in a standard system employing a reverse osmosis purification unit, some equilibrium flow occurs between the feed water side and the product water side within the confines of the spirally-wound unit. This results in the migration of some quantities of dissolved salts and minerals through the membrane, significantly contaminating the volume of product-side water remaining within the confines of the purification unit during shutdown. This equilibrium flow is dependent upon the concentration of dissolved salts and minerals on the feed side, and by operating the system so as to achieve recirculation flow of the product water, as described just above, the concentration of dissolved solids on the feed side of the unit during shutdown condition is reduced to a very acceptably low level. Because of the low level of solids in the water on the feed side in the purification unit 11 while it is in the shutdown mode, very little equilibrium flow occurs, and accordingly the water, which initially exits the unit 11 through the line 19 upon opening the tap, does not have a high solids and minerals content so that the product water being initially delivered from the tap is not undesirable from a taste standpoint.

Thus, it can be seen that the present invention provides an effective and economical way to overcome the product water contamination that normally occurs in a reverse osmosis purification unit during periods of shutdown. Moreover, it provides a very feasible way of constructing a potable water dispensing system without the need for a large, air-bladder-containing, product water holding tank. Such a tank not only represents a significant expense, but it may be sometimes considered to be undesirable as occupying a large volume of under-the-kitchen-sink space which a homemaker would prefer to have available for the storage of other items.

Although the invention has been described with regard to certain preferred embodiments which constitute the best mode presently known to the inventor for carrying out the invention, it should be understood that various changes and modifications as would be obvious to one having ordinary skill in this art may be made without departing from the scope of the invention which is defined in the claims appended hereto. For example, although the system has been described generally in terms of a household system where use is relatively restricted to numbers of a household, it is equally applicable to laboratory and other commercial systems of relatively larger capacity wherein the number of users and frequency of use will be higher. Although the absence of a product water holding tank can provide a valuable economic advantage, if desired, a standard product water holding tank may be connected into the line 19 or the line 26 upstream of the valve 27 to provide a system that still enjoys the advantage of product water of improved purity and taste.

Particular features of the invention are set forth in the claims which follow.

What is claimed is:

1. A reverse osmosis water purification system for providing potable water from an impure aqueous source without the incorporation of any accumulation tank, which system comprises:
   a reverse osmosis purification unit having an inlet, a purified water outlet and a brine outlet,
   motor driven pump means having an inlet and a discharge,
   supply means interconnecting said pump means and an impure aqueous source,
   first conduit means connecting said pump means discharge to said inlet of said reverse osmosis purification unit so as to allow the flow of liquid thereto,
   tap means for intermittently withdrawing purified water from the system,
   second conduit means connecting said purification unit purified water outlet to said tap means,
   third conduit means for returning at least some aqueous concentrate exiting from said brine outlet of said purification unit to said pump means,
   said second conduit means being branched with a first branch leading to said tap means and a second branch leading to said pump means,
   first valve means in said second branch,
   second valve means in said supply means
   sensing means associated with said tap means, and
   control means connected to said sensing means and to said first and second valve means and designed (i) to open said second valve means and to also begin operation of said pump means when said sensing means detects a condition in said second conduit means that is indicative of the opening of said tap means and (ii) to subsequently open said first valve means when a condition is sensed by said sensing means which is indicative of the closing of said tap means following withdrawal of potable water therethrough thereby causing purified water from said purified water outlet to flow directly to said pump means inlet together with water from said impure aqueous source.

2. A purification system according to claim 1 wherein said sensing means senses the pressure in said second conduit means downstream of said purification unit outlet.

3. A purification system according to claim 2 wherein said sensing means and said control means cause said first valve means to open when a rise in pressure is detected that is indicative of the closing of said tap means.

4. A purification system according to claim 2 wherein said third conduit means includes pressure-regulating means and also includes diversion means which is located between said brine outlet from said purification unit and said second pressure-regulating means for directing a portion of said liquid flow in said third conduit means to a drain.

5. A purification system according to claim 4 wherein said diversion means is designed and set so as to divert to said drain at least about 10% of the flow of liquid exiting through said brine outlet.

6. A purification system according to claim 4 wherein said pressure-regulating means is set so that the combination of said reverse osmosis purification unit and said pump means results in at least about 75% of the liquid which enters said purification unit inlet exiting via said brine outlet.

7. A purification system according to claim 1 wherein said third conduit means has second sensing means associated therewith for sensing concentration of salt and minerals in the liquid flowing out said brine outlet, and wherein said control means is interconnected with said second sensing means so as to continue to operate said pump means once said pump operation is begun until a concentration level in the liquid flowing out said brine outlet is sensed that is below a preselected limit, at which time said control means causes closing of said first and second valve means and ceases operation of said pump means.

8. A purification system according to claim 1 wherein said supply means contains a mixing device which has three inlets and one outlet for blending fresh liquid from said impure aqueous source with recirculating product liquid flow from said second branch of said second conduit means and with returning concentrate liquid flow from said third conduit means to create a composite stream flowing toward said pump means inlet whenever said first valve means is open.

9. A purification system according to claim 1 wherein said control means is designed to open said second valve means and energize a motor for driving said pump means when said pressure in said second conduit means falls below about 10 psig and, thereafter, when said second valve means is open, to open said first valve means when said pressure being sensed exceeds about 20 psig, said second conduit means being devoid of any interconnection with a pressurized storage reservoir.

10. A purification system according to claim 9 wherein said third conduit means has means associated therewith for sensing concentrations of salt and minerals in the liquid flowing therethrough and wherein said control means is interconnected with said concentration-sensing means and continues to operate said pump means once operation has begun until a concentration level is sensed that is below a preselected limit, with said preselected concentration limit being equal to or less than about a 20% concentration of salt and minerals in said stream flowing in said third conduit means and then discontinues pump operation once said level sensed is below said limit.

11. A purification system according to claim 1 wherein said reverse osmosis purification unit contains at least about 2 square meters of membrane surface area to which membrane surface said pump means supplies liquid at a pressure above about 150 psig.

12. A purification system according to claim 1 wherein said first conduit means, said second conduit means and said third conduit means, each respectively include check valve means for allowing flow only in a single downstream direction therethrough.

13. A method for providing potable water on demand from an impure aqueous source using a reverse osmosis water purification unit without any accumulation reservoir, which method comprises:

sensing the opening of tap means through which potable water is to be withdrawn, in response to said sensing, actuating a motor driven pump means having an inlet and a discharge, which pump means inlet is connected to the impure aqueous source, discharging a feed stream of impure water from said pump means under pressure to a reverse osmosis purification unit having a purified water outlet and a brine outlet and thereby causing a stream of purified water to flow from said purified water outlet to said tap means and an aqueous concentrate to flow from said brine outlet, recycling at least some aqueous concentrate exiting from said brine outlet of said purification unit back to said pump means, further sensing when said tap means is closed following withdrawal of water therethrough and thereafter recirculating said stream of purified water to mix with water flowing from the impure aqueous source and provide a composite liquid stream flowing to said pump means, continuing said recirculation until the concentration of dissolved salts and minerals in said feed stream flowing to said purification unit from said pump means reaches a predetermined low level, determining said predetermined low level of dissolved salts in said composite stream by sensing when the level of dissolved salts and minerals in said aqueous concentrate flowing from said brine outlet falls below a desired level, and halting operation of said pump means when said desired level is reached.

14. The method according to claim 13 wherein purified water flowing from said outlet flows directly to said tap means and constitutes the only flow of water to said tap means.

15. A method for intermittently providing potable water on demand for domestic use from an impure aqueous source using a reverse osmosis water purification unit without any accumulation reservoir, which method comprises:

sensing the opening of tap means through which potable water is to be withdrawn, in response to said sensing, actuating a motor driven pump having an inlet and a discharge, which pump inlet is connected to the impure aqueous source, discharging a feed stream of impure water from said pump under pressure to a reverse osmosis purification unit having a purified water outlet and a brine outlet and thereby causing a stream of purified water to flow from said purified water outlet to said tap means and an aqueous concentrate to flow from said brine outlet, recycling at least some aqueous concentrate exiting from said brine outlet of said purification unit back to said pump, further sensing when said tap means is closed following withdrawal of water therethrough and thereafter opening a valve to recirculate said stream of purified water to mix with water flowing from the impure aqueous source and with the concentrate being recycled to thus provide a composite liquid stream flowing to said pump, continuing said recirculation of purified water until the concentration of dissolved salts and minerals in said feed stream flowing to said purification unit from said pump reaches a predetermined low level, determining said predetermined low level of dissolved salts in said composite stream by sensing when the level of dissolved salts and minerals in said aqueous concentrate flowing from said brine outlet falls below a desired level, and halting operation of said pump and closing said valve when said desired level is reached.

* * * * *